US012625552B2

(12) United States Patent
Kaku

(10) Patent No.: US 12,625,552 B2
(45) Date of Patent: May 12, 2026

(54) INFORMATION DISPLAY SYSTEM

(71) Applicant: TOYOTA JIDOSHA KABUSHIKI KAISHA, Aichi-ken (JP)

(72) Inventor: Wataru Kaku, Musashino (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 19/026,369

(22) Filed: Jan. 17, 2025

(65) Prior Publication Data

US 2025/0244827 A1     Jul. 31, 2025

(30) Foreign Application Priority Data

Jan. 29, 2024     (JP) ................................. 2024-010756

(51) Int. Cl.
*G06F 3/01* (2006.01)
*G06F 3/04845* (2022.01)
*G06V 40/18* (2022.01)

(52) U.S. Cl.
CPC .......... *G06F 3/013* (2013.01); *G06F 3/04845* (2013.01); *G06V 40/18* (2022.01)

(58) Field of Classification Search
CPC ...... G06F 3/013; G06F 3/04845; G06F 3/011; G06V 40/18
See application file for complete search history.

(56) References Cited

U.S. PATENT DOCUMENTS

| | | | | |
|---|---|---|---|---|
| 5,500,671 A | * | 3/1996 | Andersson | H04N 7/144 |
| | | | | 348/E7.083 |
| 12,141,350 B2 | * | 11/2024 | Schur | G06F 3/012 |
| 2013/0070046 A1 | * | 3/2013 | Wolf | G06F 3/013 |
| | | | | 382/190 |
| 2017/0324944 A1 | | 11/2017 | Nakajima et al. | |
| 2021/0400234 A1 | * | 12/2021 | Miki | H04N 7/142 |
| 2022/0191431 A1 | * | 6/2022 | Oz | G06T 19/00 |
| 2022/0286314 A1 | * | 9/2022 | Meyer | H04L 12/1827 |
| 2024/0361831 A1 | | 10/2024 | Koizuka | |
| 2025/0209744 A1 | * | 6/2025 | Piemonte | G06F 3/1454 |

FOREIGN PATENT DOCUMENTS

| | | |
|---|---|---|
| GB | 2351216 A | 12/2000 |
| JP | 2000-244886 A | 9/2000 |
| JP | 6644371 B2 | 2/2020 |
| JP | 7150114 B1 | 10/2022 |

* cited by examiner

*Primary Examiner* — Premal R Patel

(74) *Attorney, Agent, or Firm* — HAUPTMAN HAM, LLP

(57)     ABSTRACT

An information display system includes a plurality of electronic devices connected to each other via a communication network. The plurality of electronic devices include a first electronic device used by a first user and a second electronic device used by a second user. The first electronic device detects a gaze point of the first user based on an image of the first user captured by a camera, and transmits first user gaze information including information of the gaze point of the first user to the second electronic device. The second electronic device acquires a first user image representing the first user, and executes a gaze emphasis display process that displays the first user image on a display of the second electronic device such that the first user appears to gaze at the gaze point, based on the first user gaze information.

4 Claims, 6 Drawing Sheets

1: INFORMATION DISPLAY SYSTEM

100: ELECTRONIC DEVICE

INFORMATION DISPLAY SYSTEM

CROSS-REFERENCES TO RELATED APPLICATION

The present disclosure claims priority to Japanese Patent Application No. 2024-010756, filed on Jan. 29, 2024, the contents of which application are incorporated herein by reference in their entirety.

TECHNICAL FIELD

The present disclosure relates to an information display technique using an electronic device.

BACKGROUND ART

Patent Literature 1 discloses a communication support system. The communication support system arranges user objects corresponding to a plurality of users in a two dimensional or three dimensional virtual space.

LIST OF RELATED ART

Patent Literature 1: Japanese Patent No. 7150114

SUMMARY

An information display technique using a plurality of electronic devices capable of communicating with each other will be considered. A technique is desired that can further enhance realistic sensations when an image representing a user is displayed on an electronic device of another user.

An aspect of the present disclosure is directed to an information display system.

The information display system includes a plurality of electronic devices connected to each other via a communication network. The plurality of electronic devices include a first electronic device used by a first user and a second electronic device used by a second user.

The first electronic device detects a gaze point of the first user based on an image of the first user captured by a camera. Then, the first electronic device transmits first user gaze information including information of the gaze point of the first user to the second electronic device.

The second electronic device acquires a first user image representing the first user. Then, the second electronic device executes a gaze emphasis display process that displays the first user image on a display of the second electronic device such that the first user appears to gaze at the gaze point, based on the first user gaze information.

According to the present disclosure, the first user image representing the first user is displayed on the second electronic device of the second user. At this time, the gaze emphasis display process is executed such that the first user appears to gaze at the gaze point. Thus, the second user can visually grasp what the first user is gazing at. This enhances the reality and the realistic sensations.

DETAILED DESCRIPTION

Embodiments of the present disclosure will be described with reference to the accompanying drawings.

1. Overview of Information Display System

Figure 1:
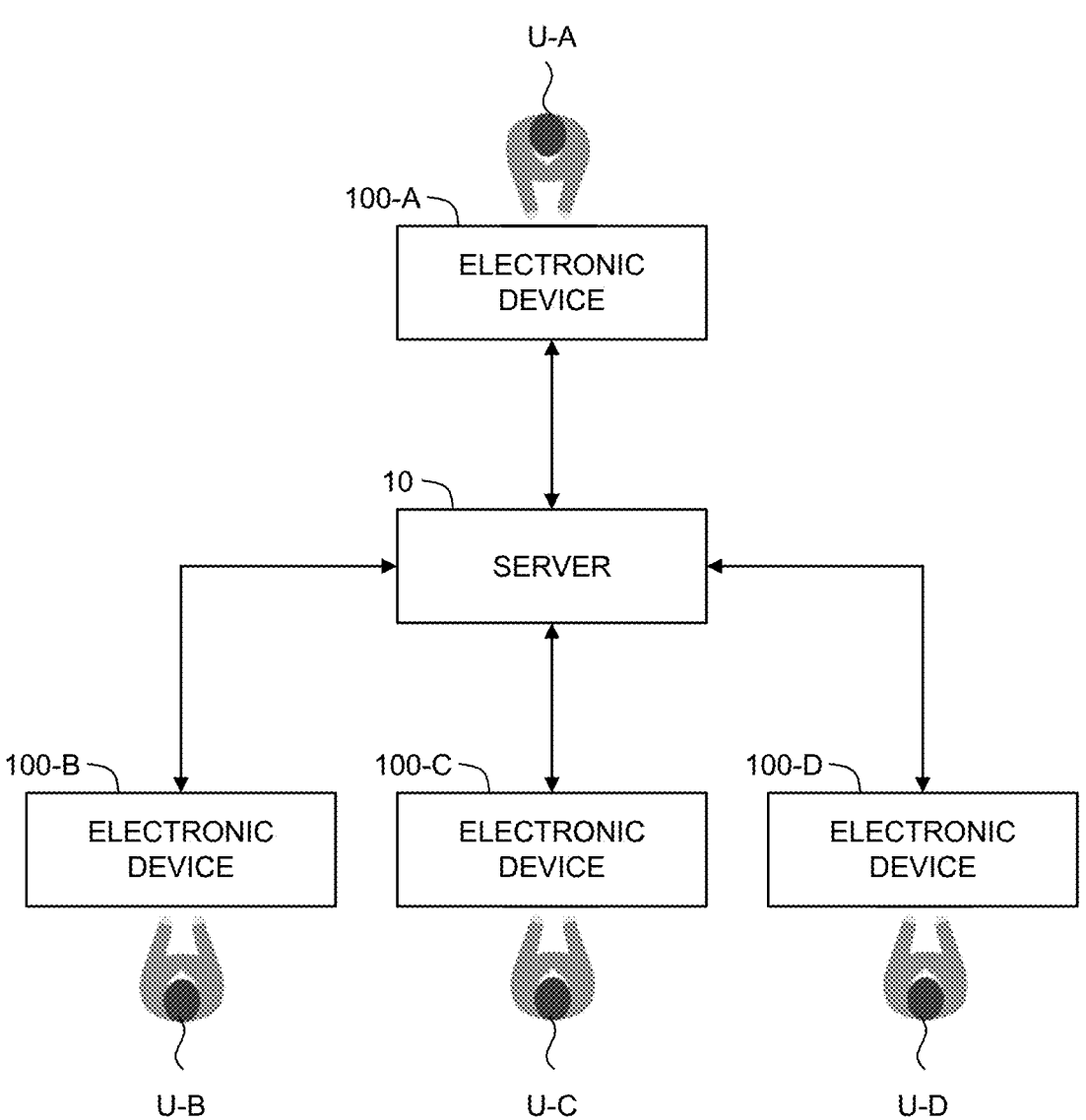
FIG. 1 is a conceptual diagram for explaining an overview of an information display system.

FIG. 1 is a conceptual diagram for explaining an overview of an information display system 1 according to the present embodiment. The information display system 1 includes a plurality of electronic devices 100. Examples of the electronic device 100 include a personal computer, a tablet, and a dedicated terminal. The plurality of electronic devices 100 are used by a plurality of users U, respectively. In the example shown in FIG. 1, the electronic devices 100-A, 100-B, 100-C, and 100-D and respective users U-A, U-B, U-C, and U-D are shown. However, the number of electronic devices 100 and the number of users U are arbitrary.

The plurality of electronic devices 100 are connected to each other via a communication network and can communicate with each other. The communication network may be a wireless communication network or a wired communication network. The plurality of electronic devices 100 may be connected to a server 10 and may communicate with each other through the server 10.

In addition, each of the plurality of electronic devices 100 includes a camera (an imaging device) and a display (display device). The camera is installed so as to be able to capture (take) an image of the user U. Typically, the camera is installed so as to be able to capture the face of the user U.

The electronic device 100-$i$ (i=A, B, C, D . . . ) acquires an image IMG-i of the user U-i captured (taken) by the camera. The image IMG-i includes at least the face of the user U-i. The electronic device 100-$i$ transmits the image IMG-i to another electronic device 100-$j$ (j≠i). The electronic device 100-$i$ may extract a feature parameter of the user U-i based on the image IMG-i and transmit information of the feature parameter of the user U-i to another electronic device 100-$j$. Examples of the feature parameter include line-of-sight information, a gaze point, an expression parameter, a posture parameter, and the like of the user U-i. Typically, the electronic device 100-$i$ transmits at least one of the image IMG-i and the feature parameter to another electronic device 100-$j$ in real time.

The electronic device 100-$j$ receives the information transmitted from the electronic device 100-$i$. The electronic device 100-$j$ acquires a user image UIMG-i representing the user U-i based on at least one of the image IMG-i and the feature parameter. The user image UIMG-i may be an original image IMG-i or may be an avatar image. The avatar image is generated by applying at least one of the original image IMG-i and the feature parameter to a predetermined person model, for example. The electronic device 100-$j$ displays the user image UIMG-i representing the user U-i on the display. The user U-j of the electronic device 100-$j$ can see the user image UIMG-i displayed on the display. That is, the electronic device 100-$j$ displays the user image UIMG-i representing the user U-i of another electronic device 100-$i$ being the communication partner, and the user U-j can see the user image UIMG-i representing another user U-i being the communication partner.

The information display system 1 according to the present embodiment is applicable to, for example, online learning, online class, online meeting, and the like. In these examples, the information display system 1 may be referred to as an online learning system, an online lesson system, an online meeting system, or the like.

2. Configuration Example of Electronic Device

Figure 2:
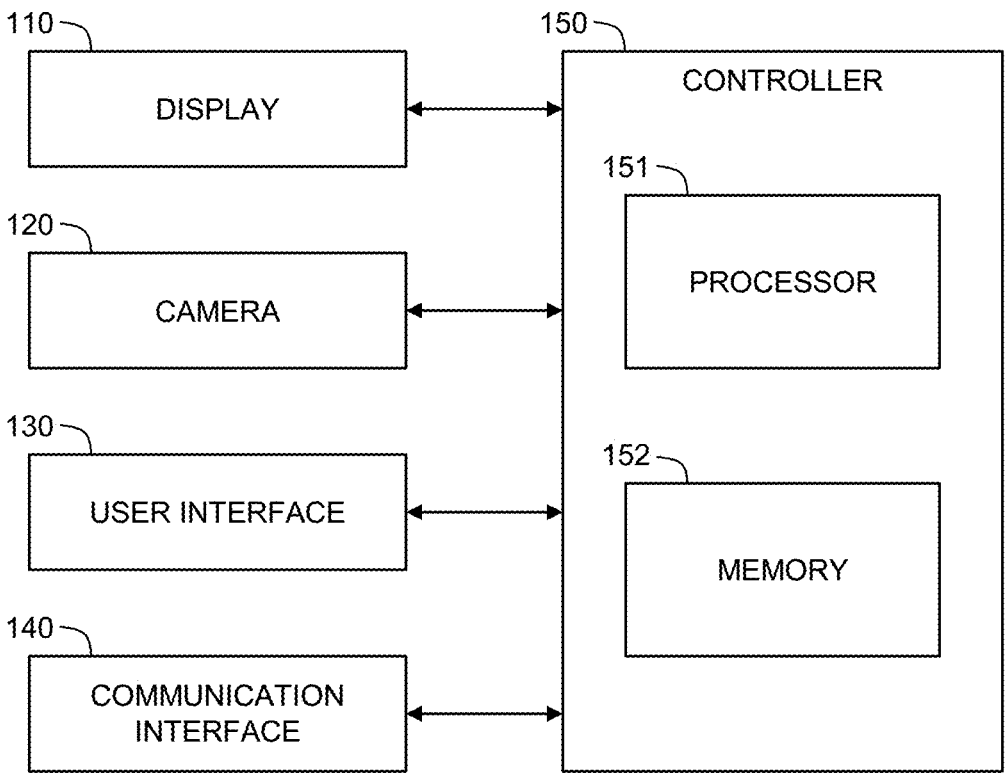
FIG. 2 is a block diagram showing an example of a configuration of an electronic device.

FIG. 2 is a block diagram showing a configuration example of the electronic device 100. In the example shown in FIG. 2, the electronic device 100 includes a display 110, one or more cameras 120 (hereinafter simply referred to as a camera 120), a user interface 130, a communication interface 140, and a controller 150.

The display 110 is configured to display a variety of information. Examples of the display 110 include a liquid crystal display, an organic EL display, a head-up display (HUD), and the like. The display 110 includes a display surface (display unit) 111. Typically, the user U of the electronic device 100 uses the electronic device 100 while facing the display surface 111 of the display 110.

The camera 120 is installed so as to be able to capture an image of the user U of the electronic device 100. Typically, the camera 120 is installed so as to be able to capture an image of the face of the user U of the electronic device 100. For example, the camera 120 is provided around the display surface 111 of the display 110.

The user interface 130 includes an input device that receives input of a variety of information from the user U. Examples of the input device include a touch panel, a keyboard, a mouse, a microphone, and the like. The user interface 130 may include an output device such as a speaker and the like.

The communication interface 140 is connected to a communication network and communicates with the outside of the electronic device 100. The communication network may be a wireless communication network or a wired communication network. For example, the communication interface 140 communicates with the server 10 or another electronic device 100.

The controller 150 executes a variety of information processing. The controller 150 may also be referred to as processing circuitry. The processing circuitry is hardware programmed to perform functions or hardware configured to perform functions.

For example, the controller 150 includes one or more processors 151 (hereinafter simply referred to as a processor 151) and one or more memories 152 (hereinafter simply referred to as a memory 152). The processor 151 executes a variety of information processing. Examples of the processor 151 include a general-purpose processor, a special-purpose processor, a central processing unit (CPU), a graphics processing unit (GPU), an application specific integrated circuit (ASIC), a field-programmable gate array (FPGA), an integrated circuit, a conventional circuit, and/or combinations thereof. The memory 152 stores a variety of information. Examples of the memory 152 include a volatile memory, a nonvolatile memory, a hard disk drive (HDD), a solid state drive (SSD), and the like. A control program is a computer program executed by the processor 151. The function of the controller 150 may be realized by a cooperation between the processor 151 executing the control program and the memory 152. The control program is stored in the memory 152. Alternatively, the control program may be recorded on a non-transitory computer-readable recording medium.

Figure 3:
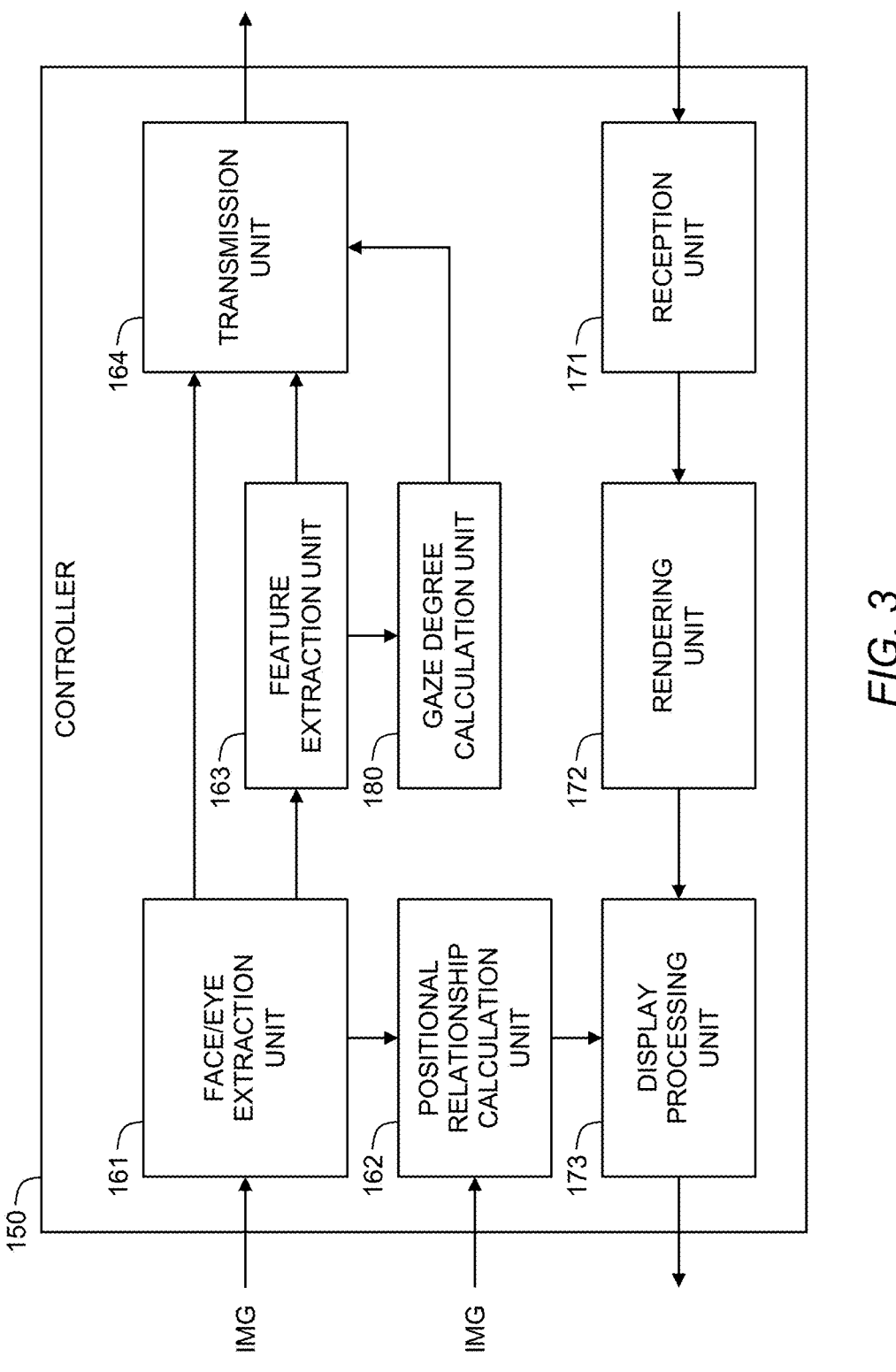
FIG. 3 is a block diagram showing an example of a functional configuration of a controller of an electronic device.

FIG. 3 is a block diagram showing an example of a functional configuration of the controller 150. In the example shown in FIG. 3, the controller 150 includes, as functional blocks, a face/eye extraction unit 161, a positional relationship calculation unit 162, a feature extraction unit 163, a transmission unit 164, a reception unit 171, a rendering unit 172, and a display processing unit 173.

The face/eye extraction unit 161 acquires the image IMG of the user U captured by the camera 120. The image IMG includes at least the face of the user U. Typically, the face/eye extraction unit 161 acquires the image IMG in real time. Then, the face/eye extraction unit 161 extracts a face image of a face portion of the user U from the image IMG. Further, the face/eye extraction unit 161 may extract images of left and right eyes of the user U from the image IMG or the face image. The extraction of the face image and the eye image is performed by the use of a machine learning model generated in advance through machine learning, for example.

The positional relationship calculation unit 162 calculates a relative positional relationship between the left and right eyes of the user U and the display surface 111 (display unit) of the display 110. More specifically, the positional relationship calculation unit 162 acquires the image IMG of the user U captured by the camera 120. The positional relationship calculation unit 162 grasps a position and a size of the face and positions of the left and right eyes of the user U in the image IMG based on the result of extraction by the face/eye extraction unit 161. An installation position, an installation direction, and an angle of view of the camera 120 are known information. It is assumed that a size of a face of a general user U is also known information. The positional relationship calculation unit 162 calculates (estimates) a relative positional relationship between the camera 120 and the left and right eyes of the user U based on the above-described known information and the position and the size of the face of the user U and the positions of the left and right eyes in the image IMG. As another example, a distance between the camera 120 and the user U may be calculated based on the blur state of the image IMG. A relative positional relationship between the camera 120 and the display surface 111 of the display 110 is also known information. The positional relationship calculation unit 162 calculates the relative positional relationship between the left and right eyes of the user U and the display surface 111 by combining the relative positional relationship between the camera 120 and the left and right eyes of the user U and the relative positional relationship between the camera 120 and the display surface 111 of the display 110.

Figure 4:
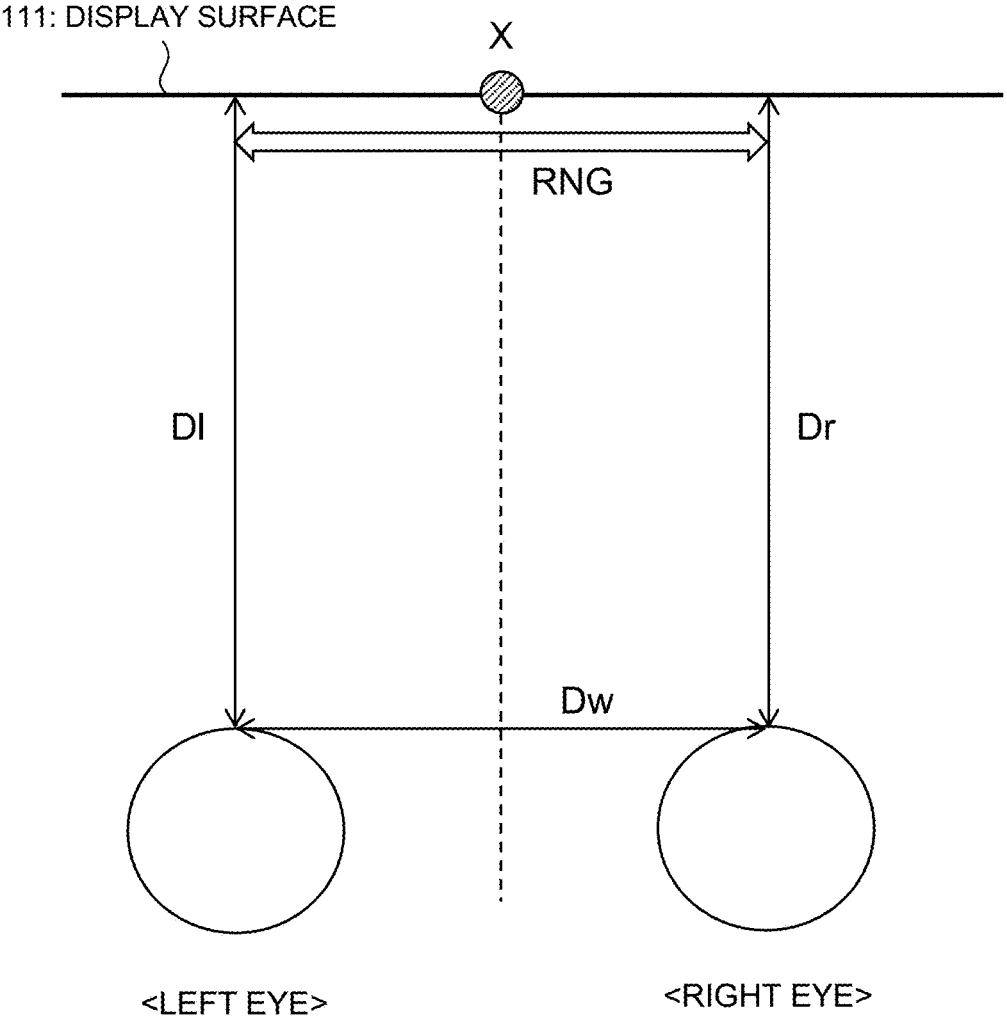
FIG. 4 is a conceptual diagram showing a relative positional relationship between left and right eyes of a user and a display surface.

FIG. 4 is a conceptual diagram showing the relative positional relationship between the left and right eyes of the user U and the display surface 111 of the display 110. The relative positional relationship includes at least a distance D1 between the left eye and the display surface 111 and a distance Dr between the right eye and the display surface 111. The relative positional relationship may include a distance Dw between the left eye and the right eye.

The feature extraction unit 163 extracts a feature parameter of the user U. Examples of the feature parameter include line-of-sight information, a gaze point, a facial expression parameter, a posture parameter, and the like of the user U. The feature extraction unit 163 extracts the feature parameter of the user U based on the images of the left and right eyes and the face image of the user U.

For example, the feature extraction unit 163 recognizes a position and a rotation angle of pupil (iris) of each eye based on the images of the left and right eyes of the user U. Then, the feature extraction unit 163 recognizes a gaze direction of each eye based on the position and the rotation angle of the pupil of each eye. The line-of-sight information includes the gaze direction of each eye. The feature extraction unit 163 may calculate coordinate information of a point at which the line of sight and the display surface 111 intersect each other, in consideration of the coordinate system on the display surface 111. The coordinate information of the point at which the line of sight and the display surface 111 intersect may be given as the line-of-sight information of the user U.

The feature extraction unit 163 may calculate a point at which the line of sight of the left eye and the line of sight of the right eye of the user U intersect. The point at which the line of sight of the left eye and the line of sight of the right eye intersect is also referred to as a focal point. When the pupil is shifted inward, the focal point becomes closer. On the other hand, when the pupil is shifted outward, the focal point becomes farther. The focal point corresponds to the "gaze point" at which the user U gazes. It should be noted that not only real-time information of the gaze point but also statistical information of the gaze point within a certain period of time may be used.

The feature extraction unit 163 may extract the facial expression parameter representing facial expression of the user U based on the face image of the user U. The extraction of the facial expression parameter is performed by the use of a machine learning model generated in advance through machine learning, for example.

The feature extraction unit 163 may extract the posture parameter indicating a posture (the angle of the face or the like) of the user U based on the face image of the user U or the image IMG. The extraction of the posture parameter is performed by the use of a machine learning model generated in advance through machine learning, for example.

The transmission unit 164 transmits information of the user U to another electronic device 100 via the communication interface 140. Typically, the transmission unit 164 transmits real-time information of the user U to another electronic device 100. The transmission information includes at least one of the image IMG of the user U, the face image, and at least a part of the feature parameters.

The reception unit 171 receives information of another user U (referred to as a user U-i for convenience) from another electronic device 100 via the communication interface 140. The received information includes at least one of the image IMG-i, the face image, and at least a part of the feature parameters of the user U-i.

The rendering unit 172 acquires the received information from the reception unit 171. The rendering unit 172 performs rendering processing based on the received information to acquire a user image UIMG-i representing the user U-i. For example, the user image UIMG-i is an avatar image. A predetermined three dimensional person model is prepared in advance. The rendering unit 172 performs the rendering processing by applying the face image or the feature parameters (facial expression and posture) of the user U-i to the predetermined three dimensional person model, thereby acquiring the avatar image representing the user U-i.

The display processing unit 173 displays the user image UIMG-i representing the user U-i on the display 110 (the display surface 111). The user U of the electronic device 100 can see the displayed user image UIMG-i.

The display processing unit 173 may display the user image UIMG-i on the display 110 (the display surface 111) such that the user U-i appears to float off the display surface 111. This process is hereinafter referred to as a "3D (three dimensional) display process" or a "stereoscopic display process". The display processing unit 173 executes the 3D display process as necessary. More specifically, the display processing unit 173 acquires information of the relative positional relationship between the left and right eyes of the user U and the display surface 111 from the above-described positional relationship calculation unit 162. Then, the display processing unit 173 executes the 3D display process based on the relative positional relationship between the left and right eyes of the user U and the display surface 111.

For example, in FIG. 4, a position X on the display surface 111 is a position corresponding to an intermediate position between the left and right eyes of the user U. A range RNG on the display surface 111 is a range corresponding to a space between the left and right eyes of the user U and includes the position X. The display processing unit 173 is able to recognize the position X and the range RNG based on the relative positional relationship between the left and right eyes of the user U and the display surface 111. Then, the display processing unit 173 displays the user image UIMG-i on the display surface 111 so as to be within the range RNG. That is, the display processing unit 173 displays the user image UIMG-i between the left and right eyes of the user U. Thus, the user U-i appears to float off the display surface 111 when viewed from the user U.

It should be noted that the 3D display process may be implemented by another method. For example, the 3D display process may be realized by a lenticular method using a lenticular lens. In the case of the lenticular method, a target image for the left eye and a target image for the right eye are separately prepared and separately displayed on the display surface 111 such that the target appears to float off the display surface 111.

It should be noted that the 3D display process is not essential. The user U-i may not appear to float off the display surface 111.

3. Gaze Emphasis Display Process

Figure 5:
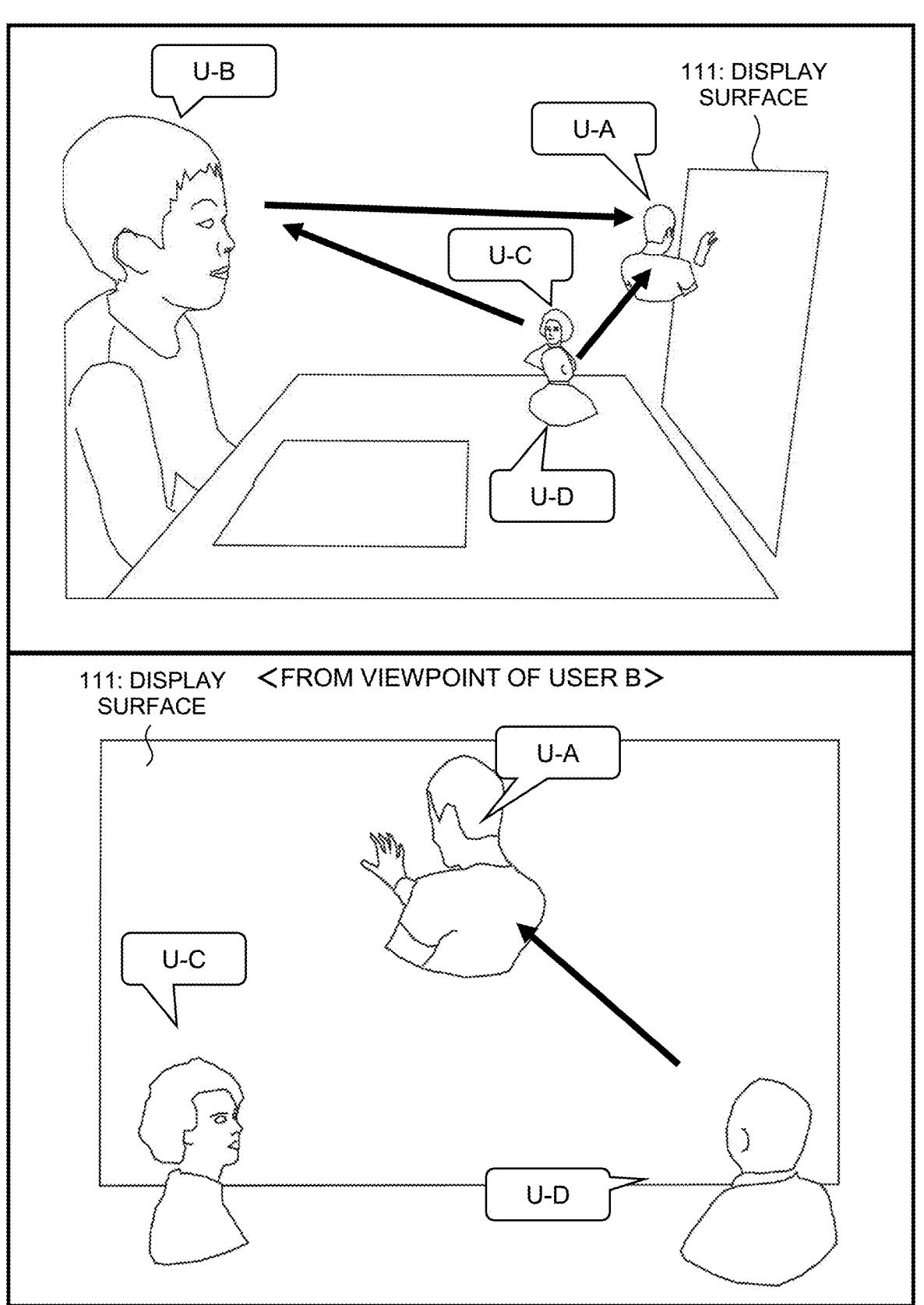
FIG. 5 is a conceptual diagram for explaining an example of a gaze emphasis display process.

FIG. 5 conceptually shows an example of the 3D display process in the electronic device 100-B used by the user U-B. The 3D display process is executed such that the plurality of users U-A, U-C, and U-D other than the user U-B appear to float off the display surface 111. Typically, the 3D display process is executed such that apparent positions of the users U-A, U-C, and U-D are present on lines connecting between the left and right eyes of the user U-B and the display surface 111.

Here, when the user U-B is able to visually grasp what another user is gazing at, reality and realistic sensations are further increased. For example, the user U-D of the electronic device 100-D is gazing at the user U-A (the user image UIMG-A) displayed through the display 110 of the electronic device 100-D. The user U-C of the electronic device 100-C is gazing at the user U-B (the user image UIMG-B) displayed through the display 110 of the electronic device 100-C. When the user U-B is able to visually grasp such the gaze state of another user, the reality and realistic sensations are further increased.

A process of displaying that enables visually grasping the grasp state of another user is hereinafter referred to as a "gaze emphasis display process". According to the present embodiment, information of the "gaze point" of each user is utilized in order to achieve the gaze emphasis display process. The "gaze point" is a concept including depth, unlike a simple gaze direction. The gaze emphasis display process is executed such that the "gaze point" of each user is reflected in appearance.

3-1. Specific Examples

Hereinafter, for the sake of description, a first electronic device 100-1 used by a first user U-1 and a second electronic device 100-2 used by a second user U-2 will be considered.

As described above, the controller 150 (the feature extraction unit 163) of the first electronic device 100-1 detects (recognizes) the gaze direction and the gaze point of the first user U-1 based on the image IMG-1 of the first user U-1 captured by the camera 120. For example, when the first user U-1 is the user U-D, the electronic device 100-D can detect (recognize) the gaze direction and the gaze point of the user U-D based on the image IMG-D of the user U-D.

The information of the gaze direction of the first user U-1 includes, for example, coordinate information of a point at which the line-of-sight of the first user U-1 intersects the display surface 111 of the display 110. The information of the gaze point of the first user U-1 includes, for example, a distance (depth) between the gaze point of the first user U-1 and the display surface 111 of the display 110. As another example, the information of the gaze point of the first user U-1 may include position information of the gaze point on the line-of-sight of the first user U-1 (that is, a positional relationship between the left and right eyes of the first user U-1, the display surface 111, and the gaze point).

The controller 150 (the feature extraction unit 163) of the first electronic device 100-1 may recognize that the first user U-1 is looking at a "first target" displayed on the display 110 of the first electronic device 100-1, based on the gaze point and the gaze direction of the first user U-1. The first target may be another user or a predetermined object. For example, when the first user U-1 is the user U-D, the electronic device 100-D recognizes that the user U-D is looking at the user U-A (the user image UIMG-A) displayed on the display 110 of the electronic device 100-D, based on the gaze point and the gaze direction of the user U-D. In this case, the user U-A is specified as the first target for the user U-D. The information of the gaze point of the first user U-1 may include information of the first target that the first user U-1 is looking at.

"First user gaze information" includes the information of the gaze direction and the gaze point of the first user U-1 thus acquired. The first user gaze information may include, as the information of the gaze point, the information of the first target that the first user U-1 is looking at. The controller 150 of the first electronic device 100-1 transmits the first user gaze information to the second electronic device 100-2.

The controller 150 of the second electronic device 100-2 acquires the first user gaze information transmitted from the first electronic device 100-1. In addition, as described above, the controller 150 of the second electronic device 100-2 acquires the first user image UIMG-1 representing the first user U-1. The controller 150 (the display processing unit 173) of the second electronic device 100-2 displays the first user image UIMG-1 on the display 110 of the second electronic device 100-2 such that the first user U-1 appears to gaze at the gaze point, based on the first user gaze information. That is, the controller 150 of the second electronic device 100-2 executes the gaze emphasis display process based on the first user gaze information. For example, the first user gaze information includes the position information of the gaze point on the line-of-sight of the first user U-1. Therefore, the controller 150 of the second electronic device 100-2 is able to display the first user image UIMG-1 such that the first user U-1 appears to gaze at the gaze point, based on the first user gaze information.

The first user gaze information may include, as information of the gaze point, the information of the first target that the first user U-1 is looking at. The controller 150 of the second electronic device 100-2 acquires the first user image UIMG-1 representing the first user U-1 and a first target image representing the first target. The controller 150 (the display processing unit 173) of the second electronic device 100-2 displays the first user image UIMG-1 and the first target image on the display 110 of the second electronic device 100-2 such that the first user U-1 appears to be gazing at the first target, based on the first user gaze information. For example, when the first user U-1 is the user U-D, the first target is the user U-A, and the second user U-2 is the user U-B, the electronic device 100-B displays the user image UIMG-D and the user image UIMG-A on the display 110 of the second electronic device 100-2 (100-B) such that the user U-D appears to be gazing at the user U-A.

Various examples are considered as embodiments of the gaze emphasis display process. A first example of the gaze emphasis display process includes displaying an arrow image (arrow object) representing a direction from the first user image UIMG-1 to the gaze point on the display 110 of the second electronic device 100-2. In the example illustrated in FIG. 5, the arrow image (arrow object) indicating a direction from the user image UIMG-D of the user U-D to the user image UIMG-A of the user U-A is displayed on the display 110 of the electronic device 100-B of the user U-B.

A second example of the gaze emphasis display process includes adjusting an orientation of the first user image UIMG-1 (three dimensional image) such that the first user U-1 appears to be facing towards the gaze point. In the example shown in FIG. 5, the orientation of the user image UIMG-D (three dimensional image) is adjusted such that the user U-D appears to be facing towards the user U-A. A combination of the first example and the second example is also possible.

Figure 6:
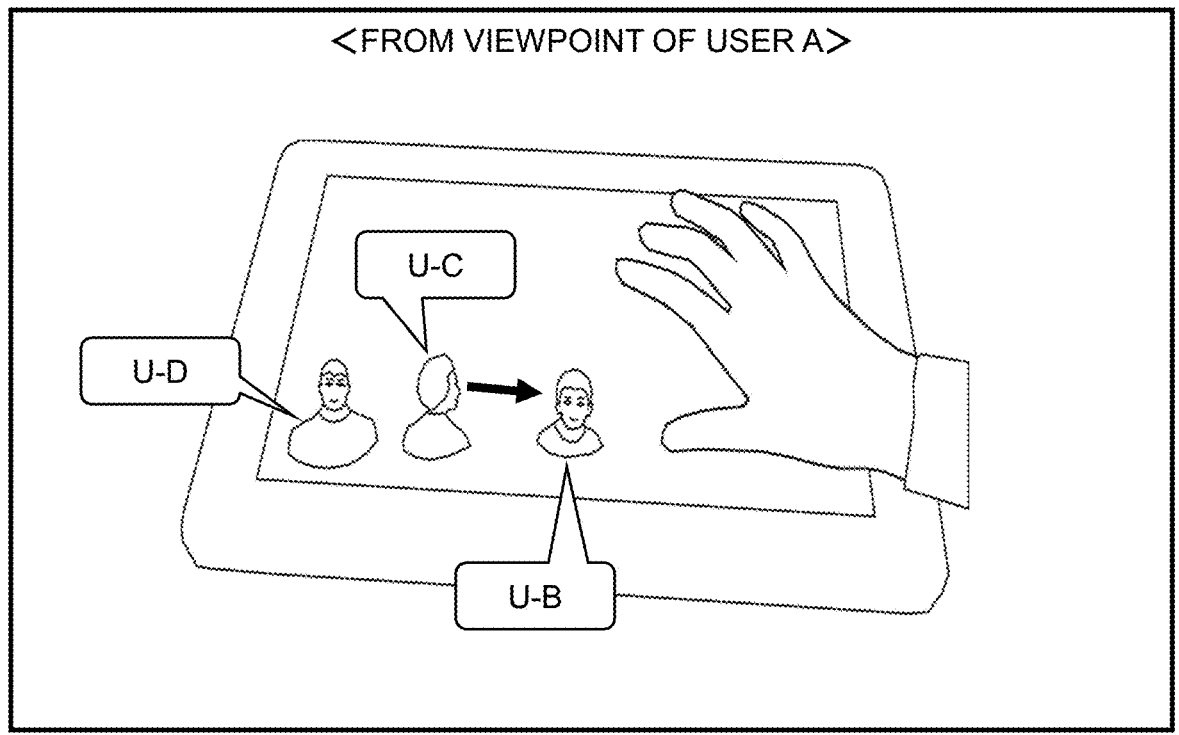
FIG. 6 is a conceptual diagram for explaining an example of a gaze emphasis display process.

FIG. 6 illustrates an example of appearance as viewed from the user U-A. The situation is the same as that shown in FIG. 5. In the example illustrated in FIG. 6, the electronic device 100-A of the user U-A is an electronic terminal such as a smartphone or a tablet. It is understood that the user U-B and the user U-D are gazing at the user U-A, and the user U-C is gazing at the user U-B.

As described above, according to the present embodiment, the first user image UIMG-1 representing the first user U-1 is displayed on the display 110 of the second electronic device 100-2 of the second user U-2. At this time, the gaze emphasis display process is executed such that the first user U-1 appears to gaze at the gaze point. The second user U-2 is able to visually grasp what the first user U-1 is gazing at. This enhances the reality and the realistic sensations. According to the present embodiment, it can be said that the information of the gaze point of each user U is effectively shared among the users U.

3-2. Gaze Emphasis Display Process in Consideration of Gaze Degree

As described above, the controller 150 of the first electronic device 100-1 can recognize that the first user U-1 is looking at the first target based on the gaze point and the gaze direction of the first user U-1. However, the gaze point of the first user U-1 is not necessarily completely equal to a display position of the first target image (i.e., an "apparent position" at which the first target image appears to float off the display surface 111). It can be understood that the first user U-1 is gazing at the first target more surely as the gaze point of the first user U-1 is closer to the display position of the first target image. Conversely, when the gaze point of the first user U-1 and the display position of the first target image are far from each other, it can be said that the first user U-1 is viewing the first target in a blurred manner.

The embodiment of the gaze emphasis display process may be changed depending on whether the first user U-1 is gazing at the first target surely or blurry. For this purpose, a "gaze degree" indicating a degree of the first user's gazing at the first target may be introduced.

For example, as shown in FIG. 3, the controller 150 may include a gaze degree calculation unit 180 that calculates the gaze degree. The gaze degree calculation unit 180 of the controller 150 of the first electronic device 100-1 acquires the position information of the gaze point of the first user U-1 from the feature extraction unit 163. Moreover, the gaze degree calculation unit 180 acquires information of the display position of the first target image (the "apparent position" at which the first target image appears to float off the display surface 111) from the display processing unit 173. The gaze degree calculation unit 180 calculates, as a deviation degree, a distance between the gaze point of the first user U-1 and the display position of the first target image. Alternatively, the gaze degree calculation unit 180 calculates a first distance between the gaze point of the first user U-1 and the display surface 111 and a second distance between the display position of the first target image and the display surface 111, and calculates a difference between the first distance and the second distance as the deviation degree. Then, the gaze degree calculation unit 180 calculates the gaze degree indicating the degree of the first user' gazing at the first target according to the deviation degree. More specifically, the gaze degree is calculated to be higher as the deviation degree is lower. Conversely, the gaze degree is calculated to be lower as the deviation degree is higher.

The first user gaze information may further include information of the gaze degree of the first user U-1. The controller 150 of the first electronic device 100-1 transmits the first user gaze information further including the information of the gaze degree of the first user U-1 to the second electronic device 100-2. The controller 150 of the second electronic device 100-2 executes the gaze emphasis display process in consideration of the gaze degree of the first user U-1. More specifically, the controller 150 of the second electronic device 100-2 executes the gaze emphasis display process such that the first user's gazing at the first target is more emphasized as the gaze degree of the first user U-1 increases.

A first example of the gaze emphasis display process includes displaying an arrow image (arrow object) representing a direction from the first user image UIMG-1 to the first target image on the display 110 of the second electronic device 100-2. In this case, a size of the arrow image increases as the gaze degree of the first user U-1 increases. Here, the size of the arrow image includes at least one of a length and a thickness of the arrow image. Changing the size of the arrow image in conjunction with the gaze degree of the first user U-1 in this manner enables the second user U-2 to visually recognize the gaze degree of the first user U-1 as well.

A second example of the gaze emphasis display process includes adjusting an orientation of the first user image UIMG-1 (three dimensional image) such that the first user U-1 appears to be facing towards the first target. In this case, as the gaze degree of the first user U-1 increases, the orientation of the first user U-1 becomes closer to the direction towards the first target. Changing the orientation of the first user image UIMG-1 in conjunction with the gaze degree of the first user U-1 in this manner enables the second user U-2 to visually recognize the gaze degree of the first user U-1 as well.

3-3. Other Examples

The controller 150 (the display processing unit 173) of the first electronic device 100-1 of the first user U-1 may perform 3D displaying of a gaze point object representing the gaze point of the first user U-1 himself/herself such that the gaze point object appears to float off the display surface 111. For example, the controller 150 (the display processing unit 173) of the electronic device 100-B of the user U-B may perform 3D displaying of a gaze point object representing the gaze point of the user U-B such that the gaze point object appears to float off the display surface 111. The position information of the gaze point of the user U-B is obtained from the feature extraction unit 163. The gaze point object has, for example, a spherical shape.

What is claimed is:

1. An information display system, comprising:
   a plurality of electronic devices connected to each other via a communication network, wherein
   the plurality of electronic devices include a first electronic device used by a first user and a second electronic device used by a second user,
   the first electronic device is configured to:
      detect a gaze point of the first user based on an image of the first user captured by a camera; and
      transmit first user gaze information including information of the gaze point of the first user to the second electronic device,
   the second electronic device is configured to:
      acquire a first user image representing the first user; and
      execute a gaze emphasis display process that displays the first user image on a display of the second electronic device such that the first user appears to gaze at the gaze point, based on the first user gaze information,
   the first electronic device is further configured to:
      recognize that the first user looks at a first target displayed on a display of the first electronic device, based on the gaze point and a gaze direction of the first user; and
      transmit the first user gaze information including information of the first target as the information of the gaze point to the second electronic device, and
   the second electronic device is further configured to:
      acquire a first target image representing the first target; and
      in the gaze emphasis display process and based on the first user gaze information, display the first user image and the first target image on the display of the second electronic device such that the first user appears to gaze at the first target.

2. The information display system according to claim 1, wherein
   the gaze emphasis display process includes at least one of:
      displaying an arrow image representing a direction from the first user image to the gaze point on the display of the second electronic device; and
      adjusting an orientation of the first user image such that the first user appears to face toward the gaze point.

3. The information display system according to claim 1, wherein
   the first electronic device is further configured to:
      calculate a gaze degree, which indicates a degree of the first user's gazing at the first target, according to a distance between the gaze point of the first user and a display position of the first target image; and transmit the first user gaze information further including information of the gaze degree to the second electronic device, and the second electronic device is further configured to execute the gaze emphasis display process such that the first user's gazing at the first target is more emphasized as the gaze degree increases.

4. The information display system according to claim 3, wherein the gaze emphasis display process includes:

displaying an arrow image representing a direction from the first user image to the first target image on the display of the second electronic device; and increasing at least one of a length and a thickness of the arrow image as the gaze degree increases.

* * * * *